United States Patent

Thomas

[15] 3,675,956

[45] July 11, 1972

[54] CONNECTOR BETWEEN TRANSMISSION ACTUATING SHAFT AND ARM THEREFOR

[72] Inventor: Dalton A. Thomas, Route One, Box 97, Alpine, Ala. 35014

[22] Filed: April 19, 1971

[21] Appl. No.: 135,101

[52] U.S. Cl..........................287/53 R, 287/53 H
[51] Int. Cl.....................................F16d 1/06
[58] Field of Search...............287/53, 52.02, 53 H

[56] References Cited

UNITED STATES PATENTS

| 793,737 | 7/1905 | Packer | 287/53 R |
|---|---|---|---|
| 2,466,077 | 4/1949 | Biggs | 287/52.02 |

FOREIGN PATENTS OR APPLICATIONS

| 339,783 | 9/1959 | Switzerland | 287/53 R |
|---|---|---|---|
| 254,200 | 11/1912 | Germany | 287/53 R |

OTHER PUBLICATIONS

I.B.M. Technical Bulletin Vol. 4, No. 3, Aug. 1961, Capstan Securing Device by A. H. Dahlin Primary Examiner—Andrew V. Kundrat
Attorney—Jennings, Carter & Thompson

[57] ABSTRACT

A connector for transmission actuating shaft and an arm having an elongated opening receiving projecting end of shaft with one side of opening tapered inwardly. A washer carrying an inwardly tapered wedge is interposed between the arm and a retainer member with the wedge between and engaging the inwardly tapered side of opening and the projecting end of shaft.

3 Claims, 5 Drawing Figures

PATENTED JUL 11 1972 3,675,956
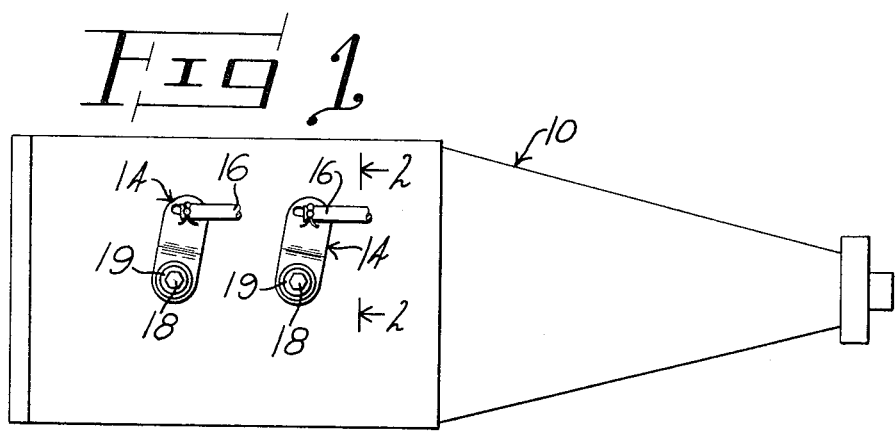
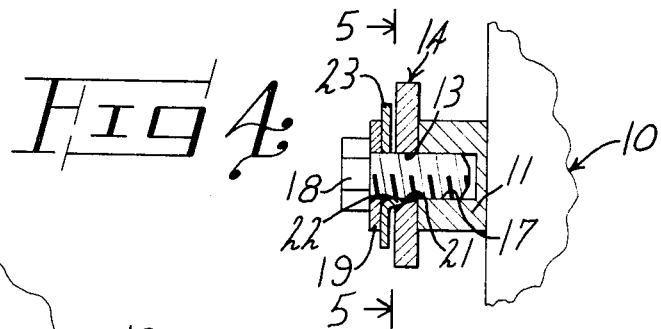
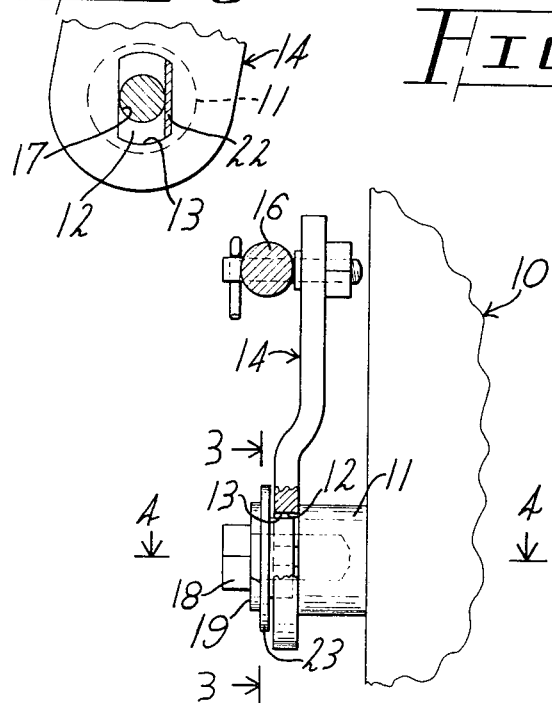
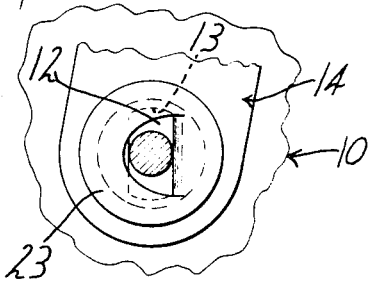
INVENTOR.
Dalton A. Thomas
BY Jennings, Carter & Thompson
Attorneys

CONNECTOR BETWEEN TRANSMISSION ACTUATING SHAFT AND ARM THEREFOR

BACKGROUND OF THE INVENTION

This invention relates to a connector between a transmission actuating shaft and the actuating arm therefor and more particularly to a connector which provides a positive connection between the arm and shaft whereby there is a minimum of lost motion therebetween.

As is well known in the art to which my invention relates, excessive wear occurs between the actuating arm and the actuating shaft of a transmission unit due to the loose fit between the connected parts. That is, the actuating arm is usually provided with an elongated opening therethrough for receiving the projecting end of the actuating shaft which corresponds generally to the opening in the arm. Accordingly, as the actuating arm moves to rotate the actuating shaft, there is relative movement between the inner surface of the elongated opening and the exterior surface of the projecting portion of the actuating shaft. This relative movement between the adjacent parts causes frictional wear therebetween each time the arm is moved. Accordingly, after a relatively short period of use, there is a substantial amount of lost motion between the actuating arm and the actuating shaft thus further increasing the frictional wear between the connected parts each time the arm is moved and at the same time reduces the efficiency of operation of the transmission unit.

BRIEF SUMMARY OF THE INVENTION

In accordance with my present invention, I provide a connector between a transmission actuating shaft and its actuating arm whereby positive contact is maintained between the connected parts and at the same time the parts may be readily separated from each other upon removal of a retainer member. The actuating arm has an elongated opening receiving the projecting end of the actuating shaft with one side of the opening tapered inwardly. A washer carrying an inwardly tapered wedge member is interposed between the arm and the retainer member with the wedge between and engaging the inwardly tapered side of the opening and the projecting end of the actuating shaft so that upon tighting the retainer member, the wedge member positively locks the actuating arm to the actuating shaft.

Apparatus embodying features of my invention is illustrated in the accompanying drawing, forming a part of this application, in which:

FIG. 1 is a side elevational view showing a conventional type transmission unit having my improved connector associated therewith;

FIG. 2 is an enlarged view taken generally along the line 2—2 of FIG. 1, parts being broken away and in section;

FIG. 3 is a view taken generally along the line 3—3 of FIG. 2;

FIG. 4 is a sectional view taken generally along the line 4—4 of FIG. 2; and,

FIG. 5 is a fragmental view taken generally along the line 5—5 of FIG. 4.

Referring now to the drawing for a better understanding of my invention, I show a conventional type transmission unit 10, such as a transmission unit for a vehicle. Projecting outwardly from the side of the transmission unit 10 are actuating shafts 11 which are spaced from each other in the usual manner. Each actuating shaft 11 is provided with a reduced portion 12 which is adapted to project into an elongated opening 13 provided in an actuating arm 14 adjacent one end thereof. The other end of each actuating arm 14 is pivotally connected to a link member 16 which is operatively connected to the gear shift mechanism in a manner well understood in the art to which my invention relates.

As shown in FIG. 5, the inner surface of the elongated opening 13 in the actuating arm 14 corresponds generally to the outer surface of the projecting end 12 of the actuating shaft 11 whereby the projecting end 12 telescopes slidably into the elongated opening 13. A threaded opening 17 is provided in the outer end of the shaft 11 and extends axially thereof for receiving a retainer member 18, such as a cap screw or the like. A suitable washer 19 is carried by the cap screw 18, as shown.

One side of the elongated opening 13 provided in the arm 14 is tapered inwardly as at 21 for receiving the tapered end of a wedge member 22. The wedge member 22 is carried by a washer-like member 23 which is interposed between the washer 19 of the retainer member 18 and the arm 14 whereby upon forcing the washer-like member 23 inwardly toward the arm 14, the wedge member 22 is forced between the inwardly tapered surface 21 and the projecting end 12 of the actuating shaft 11. That is, the wedge member 22 tapers inwardly from the washer-like member 23 and is preferably formed integrally with the washer-like member. In actual practice, I have formed the wedge member 22 by punching out the central portion of the washer-like member 23 whereby the wedge member 22 extends generally perpendicular to the inner surface of the washer-like member 23. The inwardly projecting member 22 is then shaped to form an inwardly tapered surface which extends substantially the entire length of the elongated opening 13 to thus provide a positive connection between the arm 14 and the actuating shaft 11.

As shown in FIG. 2, the washer-like member 23 is spaced from the adjacent side of the arm 14 upon tighting the retainer member 18 whereby the washer-like member 23 does not engage the arm 14 prior to positively locking the arm 14 to the shaft 11.

From the foregoing description, the operation of my improved connector assembly will be readily understood. The arm 14 is inserted over the projecting end 12 of the actuating shaft 11 in the usual manner. The washer-like member 23 is interposed between the arm 14 and the retainer members consisting of the cap screw 18 and washer 19. Upon tightening the cap screw 18, the wedge member 22 is forced positively between the inclined surface 21 and the projecting end 12 of the shaft 11. Accordingly, the arm 14 is positively locked to the actuating shaft 11 whereby there is no lost motion therebetween.

From the foregoing, it will be seen that I have devised an improved connector assembly between the actuating shaft of a transmission unit and its actuating arm. By providing a positive connection between the arm and the transmission actuating shaft and at the same time permitting the components to be separated from each other upon removal of the retainer member, I provide a removable connector assembly which eliminates lost motion between the connected parts, thus reducing frictional wear between the connected parts. Also, by forming the wedge member integrally with the washer-like member, the connector is extremely simple of construction and manufacture and requires a minimum of time to install the same. Furthermore, by spacing the wedge-like member from the arm after the retainer member and wedge-like member have been installed, I assure that the wedge member is firmly anchored between the arm and the projecting end of the shaft prior to any engagement of the washer-like member with the actuating arm. Furthermore, by providing a wedge member which extends substantially the entire length of the inwardly tapered side wall of the elongated opening in the actuating arm, I assure uniform contact by the wedge member over a substantial area.

While I have shown my invention in but one form, it will be obvious to those skilled in the art that it is not so limited, but is susceptible of various other changes and modifications without departing from the spirit thereof.

What I claim is:

1. The combination with a transmission actuating arm having an elongated opening therethrough of a size and shape to receive the projecting end of a transmission actuating shaft and a retainer member secured to said projecting end outwardly of said actuating arm forcing said actuating arm into engagement with said actuating shaft:

a. an inwardly tapered side wall defining one side of said elongated opening through said actuating arm,
b. a washer-like member interposed between said retainer member and said actuating arm,
c. an inwardly tapered wedge member carried by and projecting inwardly of said washer-like member in engagement with said inwardly tapered side wall so that upon inward movement of said retainer member said wedge member is forced between said inwardly tapered side wall and said projecting end, and
d. the inner surface of said washer-like member being spaced from the adjacent surface of said actuating arm after assembly of said retainer member.

2. The combination defined in claim 1 in which said wedge member extends substantially the length of said inwardly tapered side wall.

3. The combination defined in claim 1 in which said wedge member is formed integrally with said washer-like member.

* * * * *